L. M. M. HALL.
AEROPLANE.
APPLICATION FILED MAY 9, 1917.
1,298,338.
Patented Mar. 25, 1919.
3 SHEETS—SHEET 1.
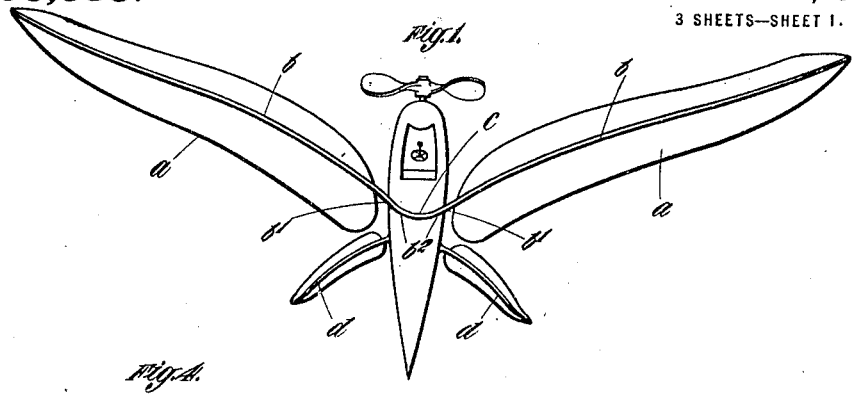
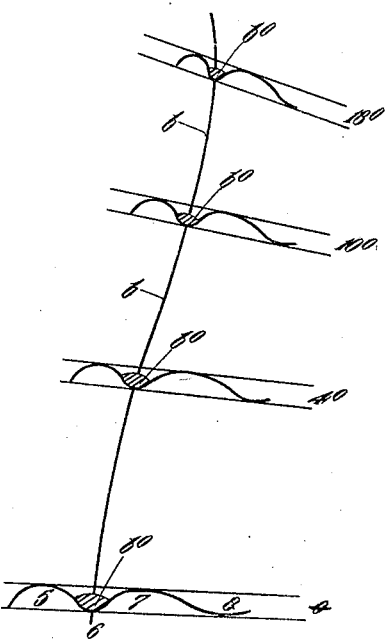
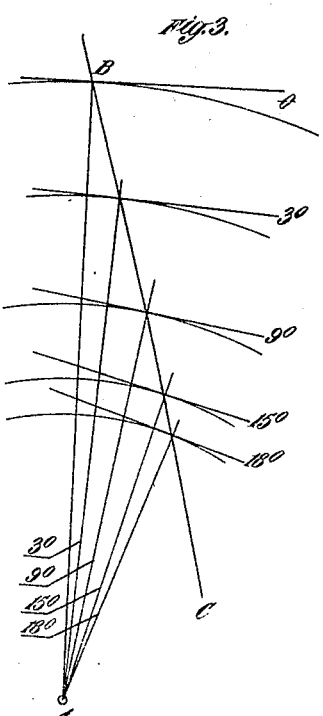
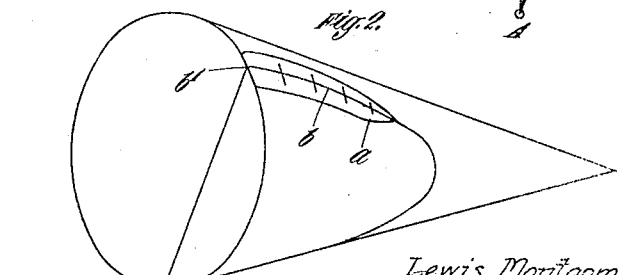
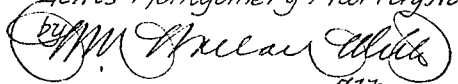
Inventor
Lewis Montgomery Murray Hall
Attorney

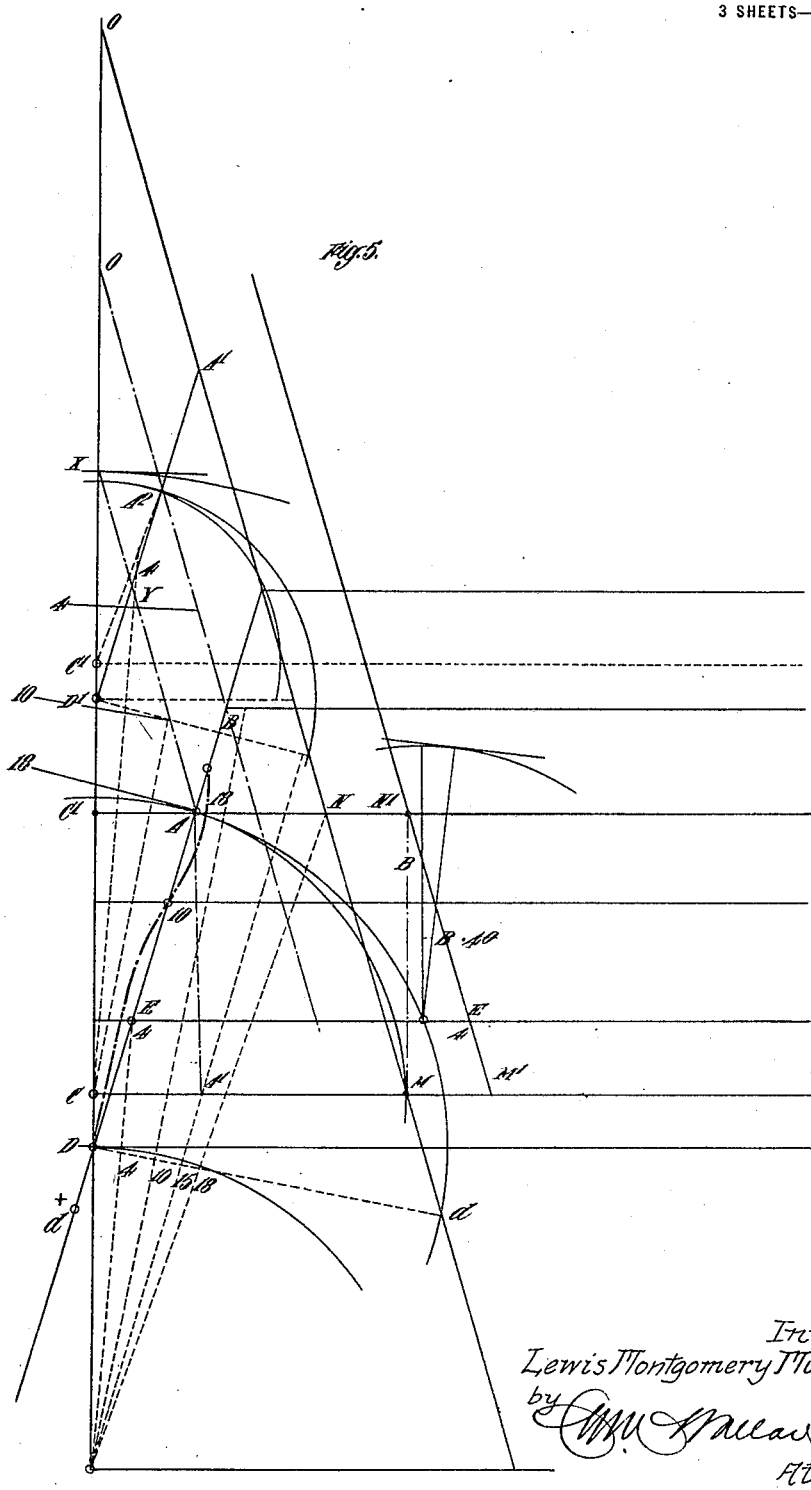

L. M. M. HALL.
AEROPLANE.
APPLICATION FILED MAY 9, 1917.
1,298,338.
Patented Mar. 25, 1919.
3 SHEETS—SHEET 3.
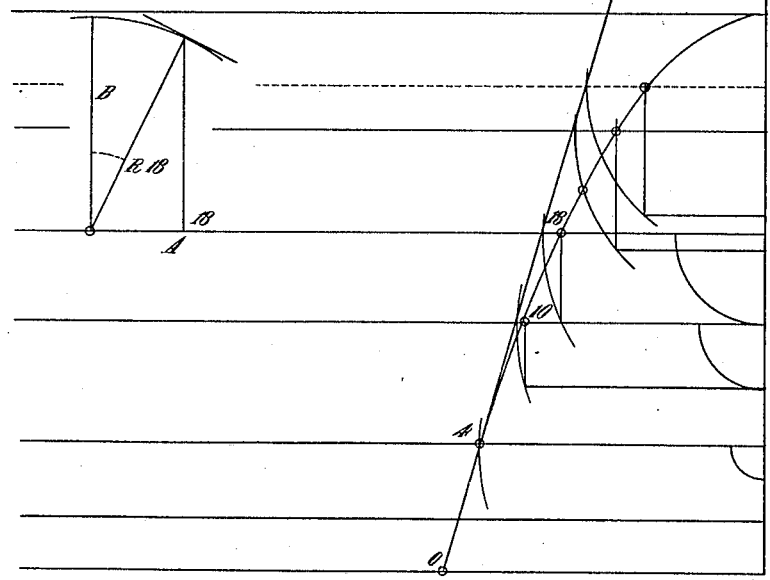
Inventor
Lewis Montgomery Murray Hall
by
Attorney.

UNITED STATES PATENT OFFICE.

LEWIS MONTGOMERY MURRAY HALL, OF EALING, LONDON, ENGLAND.

AEROPLANE.

1,298,338. Specification of Letters Patent. Patented Mar. 25, 1919.

Application filed May 9, 1917. Serial No. 167,468.

*To all whom it may concern:*

Be it known that I, LEWIS MONTGOMERY MURRAY HALL, brigadier-general of the Indian army, (retired,) a subject of the King of Great Britain and Ireland, of 12 Kent Gardens, Ealing, London, England, have invented certain new and useful Improvements in or Relating to Aeroplanes, of which the following is a specification.

This invention relates to aeroplanes and has for its object to provide an improved wing construction.

According to this invention each wing member comprises a sheet of metal of elongated form supported from a longitudinal midrib, the arrangement being such that the wing surface and the midrib are made integral or welded together in such manner that the wing surface is capable of being flexed but the flexible movement is resisted or restrained by the connection of the wing surface to the midrib, which midrib is subject to torsional stresses under the flexible movement of the wing surface. The wing surface will be supported mainly or wholly from the midrib which in turn will be rigidly fixed at its root to the aeroplane body or structure or the midribs of opposite wings may be in one piece. In this way the said wing member will represent in its stresses and construction the feather of a bird supported entirely or substantially so from the midrib but capable of displacement under torsion when in flight, the flexibility of the structure increasing toward the tip of the wing whereby the angle of incidence will decrease with the speed as will also the resistance to flight.

Although the shape of the wing or wing member in plan may be that of a flight feather of a bird's wing yet this shape may be varied to suit requirements and in structure the wing surface is entirely of sheet metal or some suitable substance which can be made integral with or welded to the midrib so that the structure as a whole will be subject to torsional stress during flight.

The wing proper may consist of one such wing member on each side of the body or two or more on each side overlapping for a portion or the whole of the length of the wing or the wings may be separately disposed one behind the other. The wings may be arranged at dihedral or other suitable angles.

I find from experiments that a wing member of the featherlike form described has the property of supporting during flight a weight disposed well in front of the wing and also that the weight in front of the wing is always supported well above the line of flight which passes through the point where the diverging angles of the wings meet. I further find that satisfactory results are obtained by a wing in which the midrib lies on or is in the form of a parabolic curve while the surface of the wing on either side of the midrib lies on the curved surface of a cone extending on either side of the parabola. In this way the cross section of the wing will lie on tangents, the angles of which increase in progression toward the tip of the wing, and I find that the best results are obtained when the cross-sectional form of the wing is of curved or arched form extending from the midrib to the edge, the rear edge for some of its length from the root toward the tip being curved slightly upward, serving a double purpose, ($i$) in giving longitudinal strength to the wing by its arched form in the reverse direction to the arch from midrib, and ($ii$) forming a bed in which a second overlapping wing would lie, thus, by pressure, sealing the two wings against air leakage upward between the two. I find that a wing constructed of sheet metal firmly fixed to the midrib gives great resistance to displacement at the root of the wing but increases in flexibility toward the tip.

Figure 1 of the accompanying drawings shows in diagram a pair of winged members or planes made in accordance with this invention.

Fig. 2 is a diagram showing how the form of the wing plane of Fig. 1 is arrived at.

Fig. 3 is a further diagram showing the relation of the various cross sections of the wing plane from root to tip and the geometrical basis by which they are arrived at.

Fig. 4 shows in diagram the cross sections of the wing at four different points in its length.

Fig. 5 is a diagram showing how the particular parabola is arrived at.

Fig. 6 is another view of the parabola shown at right angles to Fig. 5.

Referring to Fig. 1 it will be seen that each wing plane $a$ is of elongated form supported from a longitudinal midrib $b$. The wing surface and the midrib $b$ being made integral or welded together in such manner that the wing surface is capable of being flexed, while such movement is restrained by the connection of the wing surface to the midrib $b$, which midrib $b$ is subject to torsional stresses under the flexible movements of the wing surface. The midrib $b$ will be rigidly fixed at its root $b'$ to the body $c$ of the aeroplane, or such superstructure as may be necessary, while at the same time being an integral part of the midrib of the opposite wing as indicated at $b^2$.

The wing members thus represent in their stresses the feather of a bird supported entirely from the midrib $b$ but capable of displacement under torsion when in flight. Flexibility of the wing increases toward the tip whereby the angle of incidence will decrease with the speed as will also the resistance to flight.

In constructing a wing of this character the entire wing is made of sheet metal such as sheet steel pressed or otherwise formed to shape and welded to the midrib $b$ so as to be practically in one therewith as before mentioned.

Referring now to Fig. 2 this diagram illustrates the form of wing which I find from experiments gives good results. In this diagram it will be seen that the midrib $b$ lies upon or is in the form of a parabolic curve while the wing surface $a$ on either side of the midrib lies on the curved surface of a cone extending on either side of the parabola. I find that good results are obtained when the parabola is so chosen that the angle of the tangent at the midrib to the circular cross-section at or approaching the tip of the wing is 18° or thereabout in relation to the angle of the tangent to the circular cross-section at the root of the wing.

Diagram 3 illustrates in projection several tangents showing the changing angles in which corresponding cross-sections of the wing lie between the root and the tip.

Let A be the axis and apex of a cone lying horizontal and viewed endwise, and A B the vertical plane in which the axis of the cone lies, then A B will represent the vertical radius of the circle formed by a transverse section of the cone. Then B C may represent a parabola. Now in a plane at right angles to the axis let angles of 3, 9, 15 and 18 degrees be drawn to the vertical, at such points on the axis that they must meet the parabola. Then the tangents to the circles at these points will be respectively 3, 9, 15 and 18 degrees, as indicated on the respective tangents, while the tangent at B (where the parabola crosses the vertical plane through the axis) will be horizontal.

The various tangents shown illustrate the relation between the various cross-sections of the wing lying along a midrib corresponding to the parabola B C, the root of the wing being represented by B.

Fig. 4 shows diagrammatic cross-sections of the improved wing at four different points in its length from the section 1 at or about the root of the wing to the section 4 toward the tip. The midrib $b$ lies in the groove $b^o$ $b^o$ $b^o$ $b^o$ and the alternating semitubular form indicated by 5, 6, 7, 8 imparts great strength and resistance whereby the wing may be subjected to great torsional stress without buckling. It will be seen that the wing does not necessarily partake of the form of the actual conical surface lying on each side of the parabola but the parts in general relation lie in the position mentioned. Fig. 5 is a diagram showing how the particular parabola and that portion thereof which I have found to give good results is arrived at.

Fig. 6 shows another view of the parabola viewed at right angles to Fig. 5.

In order that a given length of parabola shall be obtained to meet the conditions as to the required and increasing angles of the tangents in which the cross-sections of the wing should lie, it is necessary to select a given length of parabola remote from the apex of the cone. To explain this with reference to Fig. 5, take a cone of any given angle of origin, say D O B, whose axis O D lies in a horizontal plane, where will be the point on a parabola where the tangent to the circular section through that point is 18° to the horizontal. To be clear, the conditions are: The axis is horizontal; any parabola therefore must at one point pass through the vertical plane in which the axis lies, and from this point the parabola is required to be of given length to the point where the tangent to the circle will be 18° to the horizontal.

Let O 18, Fig. 6, or D A, Fig. 5, be a given length of a parabola and D O of indefinite length be the vertical plane in which the axis of the cone lies horizontally, then the angle of origin of a cone of which D A is a parabola must be equal to the angle O D A, i. e. parallel to the parabola.

The point A (at one end of a given length of parabola) is required to be in such a position that the tangent to the circle shall be 18° to the horizontal plane. Then C is the center and C A is the radius (at 18° to the vertical plane) of that cross-section of the cone in which A lies with its tangent at 18° to the horizontal and C M is the horizontal radius of the circle representing the transverse section and by revolving about C M the plane represented by the circle of which C M is the radius to bring it vertically to the axis of the cone, A will lie vertically above A' and the cone to which the point A' belongs (A' being a substitute for A) will be represented by the line M N at an angle D O M equal to O D A. That is to say, if A is in the section of the cone C M, M N is the side of the cone to which the selected parabola belongs, but if C' N' is the section in which A lies, then M' N' is the cone to which the said parabola belongs.

Now if we attempt to put a parabola of the same dimensions in any other position within the cone whose side is M N, then the surface of the cone about the parabola will not meet conditions as to the required and increasing angles of the tangents in which the various cross-sections of the wing should lie.

There will be only one parabola of any given cone that will answer all the given conditions in the same cone (i. e. having the angle of origin constant), but parabola of varying lengths may be found in different cones to meet the conditions and they will all be in every respect similar.

It must be noted that the parabola D B in the drawing, Fig. 5, is in plan, and is therefore shorter than it would show up in section.

In Fig. 5 the dot and dash line running from D nearly up to B shows the curved form of the midrib of the wing or plane, which departs somewhat from the parabola, but it is to be understood that in general the wing lies on the parabola although the actual curved section at any one point may not correspond with the curve or the conic section.

As a wing member constructed as hereinbefore described has the property of supporting during flight a weight disposed well in front of the wing the pilot or observer and the weight generally may be carried forwardly of the planes to a much greater extent than is possible with aeroplanes as hitherto constructed, thereby giving a wider angle of vision for observation in front unimpeded by the wings.

An aeroplane having wings constructed on the above lines may be provided with additional planes constructed on the same lines and arranged at different and in some cases opposite angles to secure stability during flight and any usual or suitable rudder and steering devices or elevating devices will be provided.

In Fig. 1 oppositely inclined planes $d$ $d$ are indicated for the purpose of securing stability.

What I claim as my invention and desire to secure by Letters Patent is:—

1. For aeroplanes a wing member or plane of elongated form consisting of a longitudinal midrib, a sheet of metal constituting the wing surface, and made integral with said midrib, whereby the said wing surface is capable of being flexed and the midrib subjected to torsional stresses under the flexible movement of the wing surface.

2. For aeroplanes a wing member or plane consisting of a wing surface and a midrib so shaped that the midrib lies on a portion of a parabolic curve while the surface of the wing on either side of the midrib lies on the surface of the cone which would extend on either side of the parabola.

3. For aeroplanes a wing member or plane of elongated form supported from a longitudinal midrib and integrally fixed thereto, the wing members being of arched section on each side of the midrib and joined by an opposite bend of curved section in which the midrib lies, the trailing edge being slightly turned upward.

4. In aeroplanes a pair of wing members of elongated form consisting of a longitudinal midrib, a sheet of metal constituting the wing surface and made integral with said midrib whereby the wing surface is capable of being flexed and the midrib subjected to torsional stresses under the flexible movement of the wing surface, said pair of wings being disposed at divergent angles in the direction of flight and having the weight carried forwardly so as to give a clear angular vision to an operator in front of the point where the wings come together.

5. In aeroplanes a pair of wing members consisting of a wing surface of sheet metal made integral with a midrib and so shaped that the midrib lies on a portion of a parabolic curve while the surface of the wing on either side of the midrib lies on the surface of the cone which would extend on either side of the parabola, said pair of wings being disposed at divergent angles in the direction of flight and having the weight carried forwardly so as to give a clear angular vision to an operator in front of the point where the wings come together.

In testimony whereof I have signed my name to this specification in the presence of two subscribing witnesses.

LEWIS MONTGOMERY MURRAY HALL,
(Br. Genl. (retired, I. A.)

Witnesses:
REGINALD EATON ELLIS,
ROBERT MILTON SPEARPOINT.

Copies of this patent may be obtained for five cents each, by addressing the "Commissioner of Patents, Washington, D. C."